United States Patent [19]

Stern et al.

[11] 3,951,648

[45] Apr. 20, 1976

[54] PROCESS FOR RECOVERING PALLADIUM, MORE PARTICULARLY FROM ALUMINA CONTAINING CATALYSTS

[75] Inventors: Robert Stern, Marly le Roi; Jean-Pierre Franck, Bougival; Jean-Francois Le Page, Rueil Malmaison, all of France

[73] Assignee: Institut Francais du Petrole, Paris, France

[22] Filed: Mar. 27, 1974

[21] Appl. No.: 455,078

[30] Foreign Application Priority Data

Mar. 30, 1973 France ............................ 73.11716

[52] U.S. Cl............................................ 75/83; 75/113; 252/415; 423/22
[51] Int. Cl............................................ C22b 11/00
[58] Field of Search .................. 75/83, 113; 423/22, 423/491; 252/415

[56] References Cited

UNITED STATES PATENTS

| | | | |
|---|---|---|---|
| 2,828,200 | 3/1958 | Nixon | 75/83 |
| 3,021,209 | 2/1962 | Murray et al. | 75/83 |

FOREIGN PATENTS OR APPLICATIONS

| | | | |
|---|---|---|---|
| 556,937 | 2/1957 | Italy | 75/83 |

*Primary Examiner*—M. J. Andrews
*Attorney, Agent, or Firm*—Millen, Raptes & White

[57] ABSTRACT

Process for recovering palladium from a catalyst having a palladium content of less than 5 %, comprising contacting said catalyst with a gaseous chlorinated organic compound at a temperature sufficient for vaporizing the palladium and cooling the gaseous phase so as to recover the formed chlorinated palladium derivative.

9 Claims, No Drawings

PROCESS FOR RECOVERING PALLADIUM, MORE PARTICULARLY FROM ALUMINA CONTAINING CATALYSTS

The present invention concerns a process for treating catalysts containing palladium, in order to recover said palladium. Another object of the invention is the use of this recovered palladium either on the material from which it has been removed or on a fresh carrier.

The palladium is generally used on carriers such, for example, as carbon, alumina, silica, barium sulfate or alumina-silica, in proportions lower than 5%, for example from 0.01 to 2 % by weight, as catalyst for catalytic operations, for example hydrogenation, oxidation or post-combustion.

During their period of use, the palladium-containing catalysts undergo a loss of activity for various reasons, certain of which are known, such for example as the coke accumulation, the deposit of noxious metal compounds or physical changes such as a surface reduction.

The regeneration of the catalyst by heating in contact with oxygen or air, provides for the burning of the coke but has generally no effect on the metal impurities and the surface reduction.

After a certain number of such regenerations, palladium is no longer sufficiently active. It is then advisable to recover it. Although numerous processes for recovering noble metals have been proposed up to now, a very few of them have been applied to palladium, most of them concerning in fact platinum. As a general rule, the processes known for recovering platinum cannot be used directly, without change with palladium.

These processes generally consist of dissolving the carrier so as to obtain the metal in the form of a residue or conversely to dissolve the metal without acting on the carrier. In both cases, the operation is expensive, since the cost of the consumed reactants is further increased by the cost of a more or less substantial portion of the active metal and of the carrier which is lost. The cost of recovering is particularly high in the case of palladium.

It has also been proposed to recover palladium by volatilization, making use of aluminum chloride and nitrogen oxide or aluminum chloride and chlorine.

These processes cannot be performed at low cost since they have the inconvenience of resulting in an insufficient recovering of palladium and of obtaining said palladium in the form of a mixture which is difficult to fractionate.

As a matter of fact, only a recovering of more than 80%, preferably 95 % is economical and preferably the palladium must not be diluted with aluminum chloride when it is desired to recover it easily at the outlet of the reactor.

The present invention describes an economical process for the treatment of used catalysts containing palladium by means of which nearly all the palladium contained in the catalyst can be recovered. Moreover, the initial carrier can be made free from noxious materials and often can be reused.

According to the present invention, palladium is recovered by heating the catalyst at a temperature from 200° to 600°C while passing therethrough a gaseous stream of a chlorinated organic compound undiluted or diluted with a gas such as air, nitrogen or argon, so as to generate a volatile palladium compound which is recovered on a cold surface or in a convenient medium.

This process, provided it is used for a sufficient period of time, provides for the recovering of up to 99 % or more of the palladium. The carrier generally losses less than 2 % of its weight according to the operating conditions.

The chlorinated organic compound is used in amounts, most frequently of about 4 to 100 parts by weight, and preferably, from 4 to 20 parts by weight per part by weight of palladium.

By way of example, it is thus possible to recover about 99 % of the palladium from a catalyst having a 0.4 % content of palladium deposited on alumina, by using 10 parts by weight of $CCl_4$ per part by weight of palladium, which makes apparent the low cost of the process.

As chlorinated organic compound, we prefer to use a partially or completely chlorinated hydrocarbon, for example of the formula $C_nH_mCl_p$, in which $n$ is an integer from 1 to 6, $p$ is an integer of at least 1, $m$ is zero or an integer, provided however that m+p be equal to ($2n$ + 2), irrespective of the value of $n$, or to $2n$, when $n$ ranges from 2 to 6.

Preferably, $n = 1$ or 2 and the ratio $p/n$ is at least 2.

By way of examples, we will mention methylene chloride, chloroform, carbon tetrachloride, trichlorethylene, tetrachloroethane, hexachloroethane and tetrachloroethylene.

However carbon tetrachloride appears to be the most efficient.

The most convenient temperatures range from 200° to 600°C. There is no upper limit for the temperature. It is however interesting, for economical reasons and for avoiding an excessive attack of the carrier, to operate within the range of from 300° to 500°C.

The operation may also be conducted in two steps. In the first step, the catalyst, is treated at a temperature of from about 200° to about 300°C for sensitizing the metal and, in the second step, palladium is carried away by a strong gas stream at high temperature.

The form in which the palladium is incorporated to the catalyst, for example as metal oxide or salt, is not significant.

The palladium salt is separated by cooling. The volatile palladium salt condenses on the cold parts of the apparatus or when supplied to a water or cold liquid trap, placed after the oven.

Palladium may be recovered under several forms, either directly as chloride or after reduction to the metal form.

The reduction may be performed for example by means of hydrazine hydrate or hydrogen.

EXAMPLE 1

We place 25 g of a catalyst, containing 0.43 % of palladium deposited on alumina balls, in a glass tube of a 3 cm diameter and 50 cm length. The whole is heated to 450°C. At this temperature, a stream of 11 liters/hour of air charged with carbon tetrachloride vapor is passed therethrough. The effluent is cooled and we recover on the cold parts of the apparatus a water-soluble powder as well as the unconsumed portion of carbon tetrachloride.

The balance, after 2 hours, is as follows:
Weight loss: 1 %
Formed HCl: 0.054 mole The recovered solid compound contains palladium in the form of a salt, essentially a chloride. The palladium amount by weight is 102 mg. Approximately 95 % of the palladium is recovered. 4 cc of carbon tetrachloride have been passed through the tube. The obtained alumina contains less than 60 ppm of palladium.

EXAMPLE 2

The same reaction is carried out by using nitrogen as carrying gas. The recovered product is a yellow colour, soluble in water and contains substantially all the palladium.

EXAMPLE 3

Example 1 is repeated with a used post-combustion catalyst, which had been heated to temperatures in the range of from 800° to 900°C.

The catalyst contains 400 ppm of palladium on an alumina carrier. After 2 hours of treatment at 450°C, less than 10 pp of palladium remains on the catalyst.

The palladium recovery yield is 93 %.

EXAMPLE 4

Example 1 is repeated except that the flow of air charged with $CCl_4$ vapors is 1 liter per hour. We operate in 1 hour and the carbon tetrachloride consumption is 1 cc.

Palladium is recovered with a yield of 99 %.

We claim:

1. A process for treating a catalyst containing palladium in an amount lower than 5% by weight and a carrier, so as to recover said palladium, comprising contacting said catalyst with a gas stream consisting essentially of gaseous chlorinated hydrocarbon, at a temperature of 300°–500°C., said temperature being sufficient to form a volatile palladium compound without substantial attack of said carrier, and cooling the effluent to condense and recover said chlorinated palladium compound, the ratio by weight of the chlorinated hydrocarbon being about 4 to 100 parts by weight per part by weight of palladium contained in said catalyst.

2. A process according to claim 1, in which the catalyst consists essentially of palladium deposited on alumina.

3. A process according to claim 1, in which the chlorinated hydrocarbon has the general formula $C_nH_mCl_p$ in which $n$ is an integer from 1 to 6, $p$ is an integer of at least 1 and $m$ is either O or an integer, provided however that $(m+p)$ be equal to $(2n+2)$ when $n$ is in the range of from 1 to 6, or to $2n$ when $n$ is in the range of from 2 to 6.

4. A process according to claim 3, in which $n$ is 1 or 2, and the ratio $p/n$ is at least 2.

5. A process according to claim 1, in which the chlorinated hydrocarbon is carbon tetrachloride.

6. A process according to claim 1, in which the ratio by weight of the chlorinated hydrocarbon to palladium is from 4 to 20.

7. A process according to claim 1, in which the chlorinated hydrocarbon is used in admixture with oxygen, nitrogen or argon.

8. A process according to claim 1, comprising treating the recovered chlorinated palladium compound with a reducing agent so as to be converted to palladium metal.

9. A process according to claim 8, in which the reducing agent is hydrazine or hydrogen.

* * * * *